UNITED STATES PATENT OFFICE.

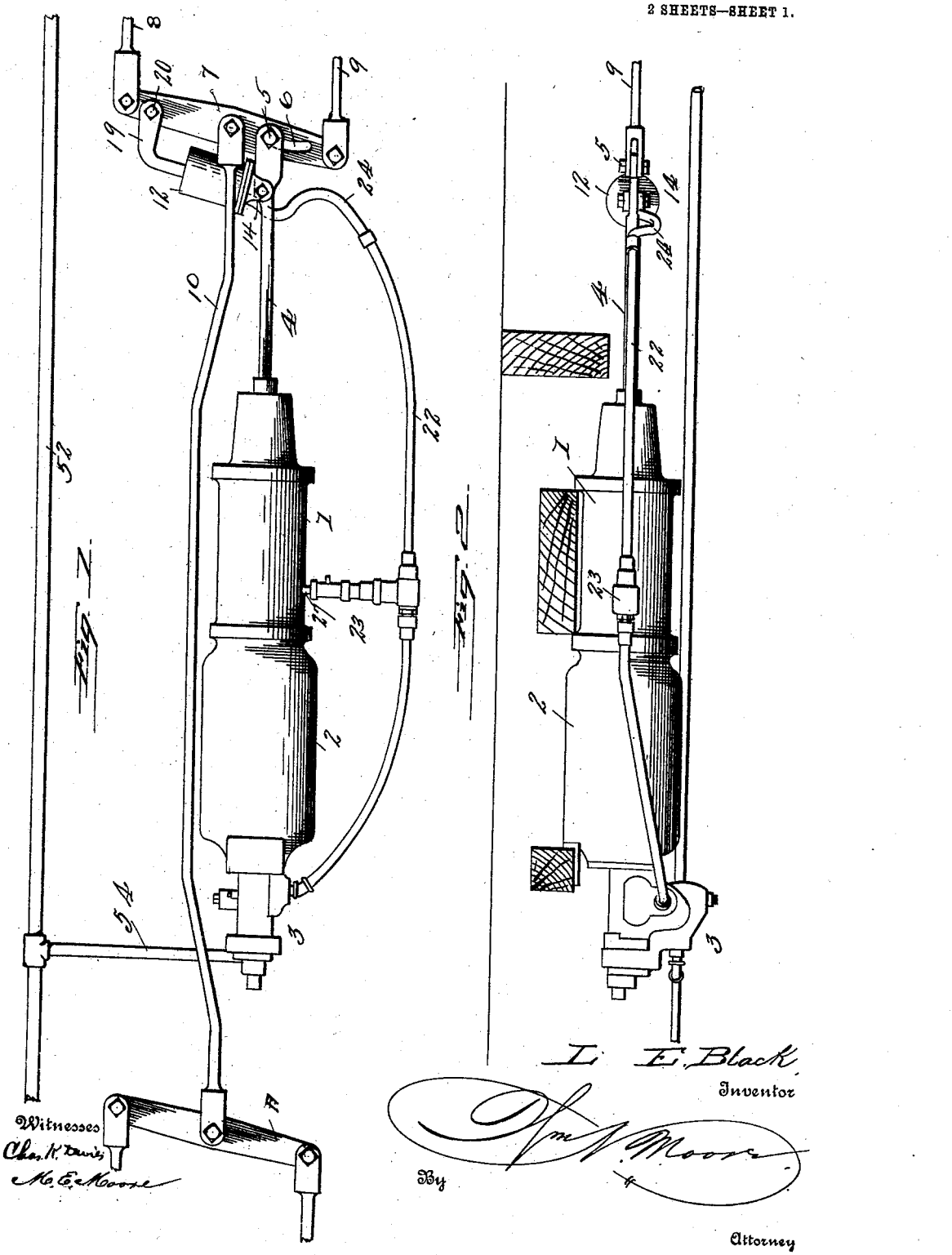

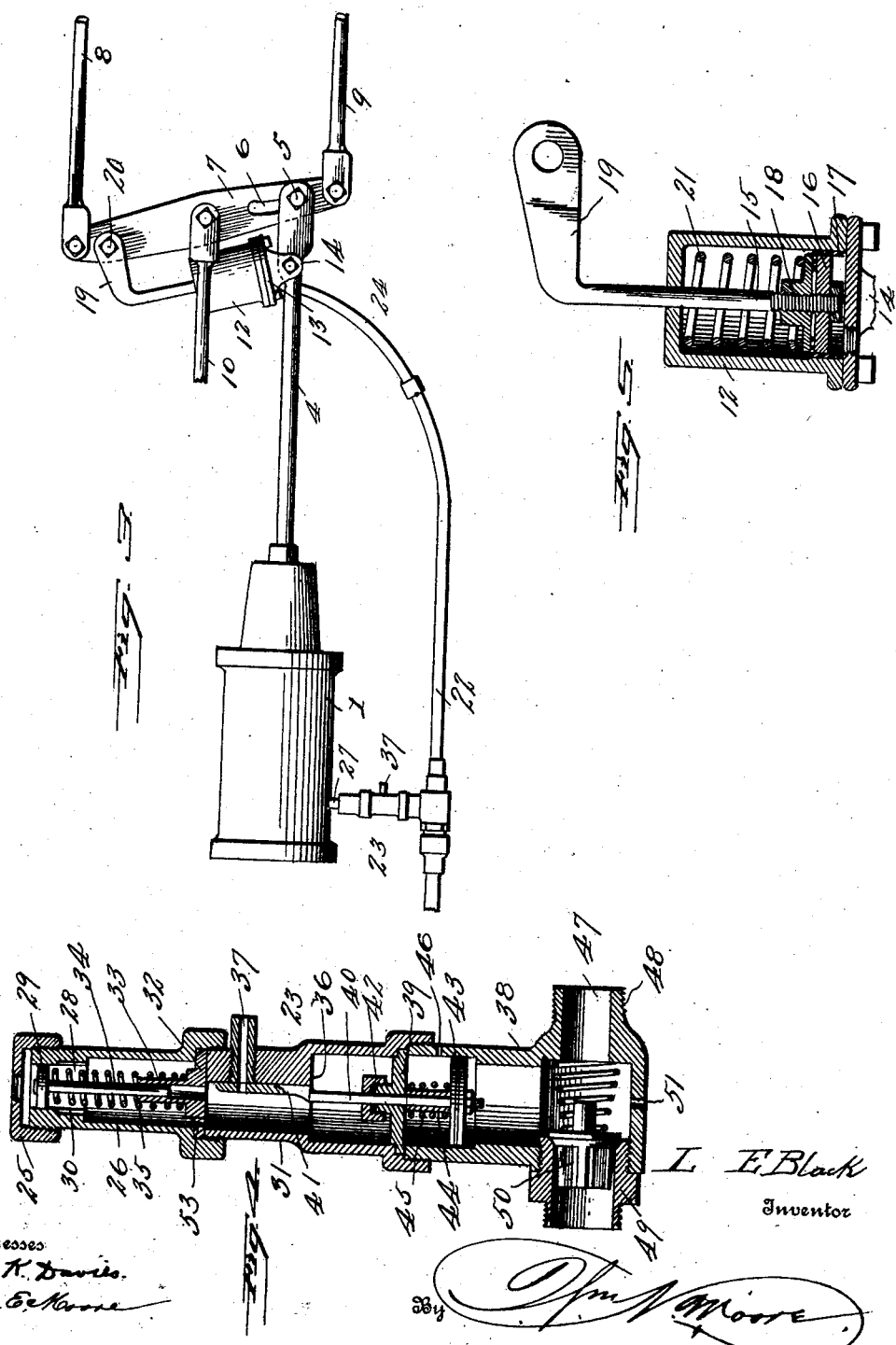

LEWIS EUGENE BLACK, OF NASHVILLE, TENNESSEE.

AIR-BRAKE.

No. 840,197.  Specification of Letters Patent.  Patented Jan. 1, 1907.

Application filed April 27, 1906. Serial No. 314,000.

*To all whom it may concern:*

Be it known that I, LEWIS EUGENE BLACK, a citizen of the United States, residing at Nashville, in the county of Davidson and State of Tennessee, have invented certain new and useful Improvements in Air-Brakes, of which the following is a specification.

My invention relates to improvements in air-brakes, and refers more particularly to the shift and reduction valves for such a system.

The primary object of this invention is to provide a fluid-pressure brake by means of which a quick emergency stop may be effected without causing inconvenient jarring or jerking or injurious sliding of the wheels.

In most systems now in use when a quick stop is effected the wheels have to be braked so hard that the brake-shoes stick and the wheels slide and cause much damage both to the track and the vehicle. By means of my invention when an emergency stop is called for the pressure is first admitted to an auxiliary or shift cylinder, which shifts the brake-lever and gives a long-arm leverage to the same, so that when the brake-piston is operated, which is about half a second's time after the shift-cylinder, it is able to exert great braking power on the wheels. Now as the vehicle loses momentum and the wheels revolve more slowly pressure is automatically released in the shift-cylinder, which thereby returns the brake-lever to the normal short-arm leverage, (as the brakes are released,) and as the pressure is also gradually reduced in the brake-cylinder at the same time the vehicle is brought to a quick stop without danger to the passengers or injury to the vehicle.

Further objects of the invention are the provision of a brake system which will be positive and speedy in operation and will be thoroughly reliable and practical in every respect.

With these and other objects in view my invention consists of a brake-cylinder, a triple valve and auxiliary reservoir in connection therewith, a shift-cylinder carried by the brake piston-rod adapted to shift the brake-lever, a reduction-valve connected with the brake-cylinder, and connection between the triple valve, reduction-valve, and shift-cylinder.

My invention further consists of an air-brake embodying certain other novel features of construction, combination, and arrangement of parts, substantially as disclosed herein.

Figure 1 is a top plan view of a brake-cylinder and connections with my improvements added thereto, the brakes being in released position. Fig. 2 is a side elevation thereof. Fig. 3 is a plan view of the brake-cylinder and connection with the brake-rods, the parts being in the emergency or set position. Fig. 4 is a longitudinal sectional view of the shift and reduction valve. Fig. 5 is a similar view of the shift-cylinder.

Referring in detail to the drawings, the numeral 1 designates a brake-cylinder having the auxiliary reservoir 2 in connection therewith, and said reservoir is provided with a triple valve 3, all of these parts being of common construction. The brake piston-rod 4 carries at its outer end a pivotal bolt 5, which engages a longitudinal slightly-curved slot 6, formed near the lower end of the brake-lever 7, so that said lever is pivotally connected to the piston-rod and is capable of limited lateral movement thereon. The brake-rod 8 and the hand brake-rod 9 are pivoted in the upper and lower ends of the lever, respectively, and centrally pivoted to the lever on the opposite side thereof is the brake-rod 10, which at its other end is secured to the floating lever 11 for operating the opposite set of brakes.

A smaller cylinder 12, which I will designate as a "shift-cylinder," is provided with a head 13, having lugs or ears 14 formed thereon, by means of which it is pivotally secured near the end of the brake piston-rod adjacent the point of connection with the brake-lever. Mounted upon the piston-rod 15 in said cylinder is the piston 16, provided with the annular ring or washer 17 to make close joint with the walls of the cylinder. The end of the piston-rod may be threaded, as shown, and mounted upon said threaded portion is the disk 18, which clamps the washer to the piston. The outer end of the piston-rod is bent at an angle, as at 19, and formed with a pair of ears, by means of which it is connected near the upper end of the brake-lever at 20. A coiled spring 21 is confined in the cylinder and normally holds the piston in the retracted position shown in Fig. 5. An external pipe 22 leads from the triple valve through the reduction-valve 23, and thence, by means of the flexible hose-coupling 24, to the lower cylinder-head 13 of the shift-cylinder, and the purpose of this connection will be described later.

My improved shift and reduction valve will now be described in detail, and for this purpose attention is directed to Fig. 4 of the drawings. For the sake of convenience in reading the drawings the parts will be taken up in order from top to bottom, as shown in the vertical section. The numeral 25 designates a screw-cap, which is secured upon the upper end of a cylindrical casing or chamber 26, and this cap is formed with a tapped opening, which by means of the short pipe 27 (shown in Figs. 1 and 3) is in direct communication with the brake-cylinder. The upper end of the casing is of reduced bore at 28 to form a cylindrical chamber for the piston 29, and grooves or channels 30 are formed in the reduced passage and extend from about midway its length downward to the enlarged portion of the casing. This upper casing is formed with a flanged lower end, which engages the upper end of the intermediate chambered portion 31 of the valve, and at this joint between the meeting ends of the two parts of the valve is secured a disk or plate 32, formed with a central sleeve or guide 33 for the reception of the stem 34, carrying the piston 29 and having an opening 53 therein to allow free passage of the air through the disk. A spring 35 surrounds the sleeve and stem and engaging the piston serves to normally hold it in the uppermost position. The chambered portion 31 is provided on one side with a shouldered abutment 36, which forms a valve-seat to the exhaust-passage 37. The lower end of the chambered portion is connected by a flanged rim to the lower check-valve casing 38 and at the point of connection is interposed a partition 39, through which is passed the piston-rod or valve-stem 40, provided at its upper end with a slide-valve 41, adapted to cover the exhaust-passage. A suitable stuffing-box 42 surrounds the valve-stem to render the outlet therefor air-tight. Mounted upon the lower end of the valve-stem is a piston 43, and on the stem above the piston is a comparatively long sleeve or collar 44 to limit the upward movement of the stem. A spring 45 surrounds the collar, tending to drive the piston downward, and a permanent outlet-port 46 is provided above the piston, so that the spring will be the only resistance to the upward movement of the piston. The base of the casing just described is provided with a right-angled passage 47, which is exteriorly threaded at one end 48 to receive pipe-coupling and at the opposite end is interiorly threaded to receive a nipple or coupling 49, formed at its inner end with a valve-seat adapted to be closed by the spring-pressed check-valve 50. A small port 51 is formed in the lower wall of this casing, so as to gradually exhaust the pressure in the pipe between the check-valve and the shift-cylinder.

The parts of the invention having thus been described, the operation is as follows: Compressed air from the main reservoir (not shown) is conveyed by the train-pipe 52 and branch pipe 54 to the auxiliary reservoirs on the several cars. When the pressure in the train pipe and the auxiliary reservoirs is the same, the parts remain in the position shown in Fig. 1 and the brakes are off; but when a quick or emergency application of the brakes is necessary the pressure is decreased in the train-pipe by means of the engineer's valve, and the triple valve (commonly known as the "New York triple valve") is actuated by the expansion of the air in the auxiliary reservoir and exhausts air of, say, ten pounds pressure to the shift-cylinder by way of the passage in the reduction-valve. The piston of the shift-cylinder is thereby thrust outward, carrying with it the brake-lever, which gives a long-arm leverage to the brake piston-rod. The pressure in the pipe between the shift-cylinder and check-valve raises the piston 43, thereby opening the slide-valve or exhaust-passage in the reduction-valve About half a second after the operation of the shift-cylinder the triple valve admits pressure from the auxiliary reservoir to the brake-cylinder, which shoves the piston out and applies the brakes with great force, the parts then being in the position shown in Fig. 3. If this great braking force were continued, the brake-shoes would stick to the wheels and cause them to slide, so I overcome this difficulty by providing for a gradual reduction of the pressure in the brake-cylinder and allowing the brake-lever to return to the short-arm leverage position. This operation I accomplish as follows: The full pressure first admitted to the brake-cylinder forces the piston out with great braking power, and as the air expands in the cylinder it forces the piston 29 in the reduction-valve downward, and the excess pressure gradually escapes around said piston by means of the grooves 30, thence through the opening 53 and exhaust-valve 37 to the atmosphere. The air in the pipe between the check-valve 50 and the shift-cylinder gradually escapes through the small port 51, and by means of the spring 21 in the shift-cylinder the piston therein is gradually retracted and the brake-lever resumes its short-arm leverage position. As the air escapes as described, the pressure in front of the check-valve is necessarily reduced, and the spring 45 forces the piston 43 downward and gradually closes the exhaust-port in the reduction-valve. The brakes will then remain set until equilibrium is again established in the system, when the spring in the brake-cylinder will retract the piston therein and release the brakes.

From this description, taken in connection with the drawings, it will be evident that I have provided a brake system in which the objects herein set forth have all been accomplished, which posseses many desirable and novel features and which is thoroughly practical and efficient for the purposes named.

I claim—

1. In a brake system, the combination with a brake-cylinder, auxiliary reservoir and triple valve, of a reduction-valve in communication with the brake-cylinder, and a shift-cylinder mounted on the brake piston-rod.

2. In a brake system, the combination with a brake-cylinder, auxiliary reservoir and triple valve, of a reduction-valve in communication with the brake-cylinder, a brake-lever, and means for shifting the brake-lever on the brake piston-rod.

3. In a brake system, the combination with a brake-cylinder having a piston-rod therein, triple valve and auxiliary reservoir, a valve in connection with the brake-cylinder having an exhaust-port, a brake-lever slidably secured to the brake piston-rod, and means for shifting the brake-lever on the piston-rod.

4. In a brake system, the combination with a brake-cylinder having a piston-rod therein, auxiliary reservoir and triple valve, a reduction-valve mounted on the brake-cylinder having connection with the triple valve, a brake-lever adjustably connected with the brake piston-rod, and pneumatically-operated means for shifting said lever, in connection with the reduction-valve.

5. In a brake system, the combination with brake-cylinders having piston-rods therein, auxiliary reservoirs and triple valves, of valves in communication with the brake-cylinders having outlet-ports controlled by the exhaust from the triple valves, brake-levers slidably secured to the brake piston-rods, shift-cylinders adapted to shift the brake-levers, said cylinders also operated by the exhaust from the triple valves.

6. The combination with a brake-cylinder having a piston and rod therein, an auxiliary reservoir and triple valve, a valve in communication with the brake-cylinder adapted to gradually reduce the pressure therein, a brake-lever adjustably secured to the brake piston-rod, of means carried by the brake piston-rod for shifting the lever thereon.

7. In a fluid-pressure brake, the combination with a brake-cylinder, auxiliary reservoir and triple valve, a brake-lever slidably secured to the brake piston-rod, a cylinder carried by the brake piston-rod adapted to shift the brake-lever thereon, of means for admitting pressure to the shift-cylinder and gradually reducing the pressure in the brake-cylinder.

8. In a brake system, the combination with a brake-cylinder provided with piston-rod, an auxiliary reservoir and triple valve, a brake-lever movably secured to the brake piston-rod, of a cylinder carried by the brake piston-rod adapted to shift the lever thereon, said shift-cylinder adapted to be operated by exhaust-pressure from the triple valve.

9. In a fluid-pressure brake, the combination with a brake-cylinder, a brake-lever movably secured to the brake piston-rod, of means for shifting the brake-lever on the piston-rod, and means controlling the operation of the shifting means and adapted to gradually reduce the pressure in the brake-cylinder.

10. In a brake system, the combination with a brake-cylinder provided with piston-rod, a brake-lever movably secured to the brake piston-rod, a cylinder carried by the brake piston-rod adapted to shift the lever thereon, of means for gradually reducing the pressure in the brake-cylinder.

11. In a brake system, the combination with a brake-cylinder, auxiliary reservoir and triple valve, of a brake-lever movably connected to the brake piston-rod, a cylinder carried by said piston-rod adapted to shift the brake-lever thereon, connection between the exhaust of the triple valve and said shift-cylinder, and means in communication with said connection for gradually reducing the pressure in the brake-cylinder.

12. In combination, a brake-cylinder provided with piston-rod, an auxiliary reservoir and triple valve, a brake-lever movably connected with the brake piston-rod, pneumatically-operated means for shifting the lever on said rod, pipe connection between the exhaust of the triple valve and said pneumatically-operated means, means in connection with the brake-cylinder for gradually reducing the pressure therein and also communicating with said pipe connection, said shift-cylinder adapted to be first operated by the exhaust of the triple valve, said brake piston-rod adapted to be actuated after the shifting of the brake-lever thereon.

13. In a brake system, the combination with a brake-cylinder, auxiliary reservoir and triple valve, a brake-lever movably connected to the brake piston-rod, means for shifting the lever on the piston-rod, and controlling means for first actuating the shifting means, then operating the brake-piston and gradually reducing the pressure in the brake-cylinder, and means for returning the shifting means to the first position.

14. In an air-brake system, the combination with a brake-cylinder, auxiliary reservoir and triple valve, a brake piston-rod having movable connection with a brake-lever, pneumatically-operated means for shifting the brake-lever on the piston-rod, of a valve between the triple valve and shifting means adapted to admit exhaust-pressure from the triple valve to operate the shifting means, said valve actuated by the exhaust-pressure to open an exhaust-port in connection with the brake-cylinder.

In testimony whereof I affix my signature in presence of two witnesses.

LEWIS EUGENE BLACK.

Witnesses:
NICK. S. BROWN,
C. McMILLON.